(12) United States Patent
Kuo et al.

(10) Patent No.: US 8,296,275 B2
(45) Date of Patent: Oct. 23, 2012

(54) DATA PROCESSING METHOD, DATA PROCESSING SYSTEM, AND STORAGE DEVICE CONTROLLER

(75) Inventors: Pei-Lin Kuo, Taichung (TW); Shih-Hsien Hsu, Changhua County (TW)

(73) Assignee: Phison Electronics Corp., Miaoli (TW)

( * ) Notice: Subject to any disclaimer, the term of this patent is extended or adjusted under 35 U.S.C. 154(b) by 239 days.

(21) Appl. No.: 12/691,986

(22) Filed: Jan. 22, 2010

(65) Prior Publication Data

US 2011/0125815 A1 May 26, 2011

(30) Foreign Application Priority Data

Nov. 24, 2009 (TW) .............................. 98140001 A (51) Int. Cl.
*G06F 17/30* (2006.01)
(52) U.S. Cl. ...................................................... 707/694
(58) Field of Classification Search ................... 707/694
See application file for complete search history.

(56) References Cited

U.S. PATENT DOCUMENTS

| | | | | |
|---|---|---|---|---|
| 6,742,078 B1 * | 5/2004 | Chien et al. | ................... | 711/103 |
| 7,114,028 B1 * | 9/2006 | Green et al. | ................... | 711/111 |
| 7,890,793 B1 * | 2/2011 | Mohl | ................... | 714/3 |
| 2002/0095389 A1 * | 7/2002 | Gaines | ............... | 705/67 |
| 2005/0154821 A1 * | 7/2005 | Furuhashi et al. | ............ | 711/112 |
| 2006/0031632 A1 * | 2/2006 | Moran et al. | ................... | 711/112 |
| 2006/0047920 A1 * | 3/2006 | Moore et al. | ................... | 711/154 |
| 2006/0069840 A1 * | 3/2006 | Corbett et al. | ................ | 710/313 |
| 2006/0143365 A1 * | 6/2006 | Kikuchi | ......................... | 711/103 |
| 2006/0155918 A1 * | 7/2006 | Oshima | ......................... | 711/103 |
| 2007/0198801 A1 * | 8/2007 | Hsieh | ................................ | 711/170 |
| 2010/0122313 A1 * | 5/2010 | Ivgi | ................................... | 726/1 |

OTHER PUBLICATIONS

Microsoft Corporation, FAT General Overview of On-Disk Format, Dec. 6, 2000.*
Wilson, Volume Serial Numbers and Format Date Time Verification, Jun. 2005.*

* cited by examiner

*Primary Examiner* — William Spieler
(74) *Attorney, Agent, or Firm* — J.C. Patents (57) ABSTRACT

A method and a system for processing data, and a storage device controller are provided. In the present method, a storage device is provided, and the storage device is coupled to a host. The method also includes, when the host gives a write-in command and the write-in command includes a logical accessing address and a first data, determining whether the logical accessing address is one of logical accessing addresses of file system information. When the logical accessing address is one of the logical accessing addresses of the file system information, the storage device writes a second data into the storage device at a predetermined time, and the second data is different from the first data.

23 Claims, 5 Drawing Sheets

DATA PROCESSING METHOD, DATA PROCESSING SYSTEM, AND STORAGE DEVICE CONTROLLER

CROSS-REFERENCE TO RELATED APPLICATION

This application claims the priority benefit of Taiwan application serial no. 98140001, filed on Nov. 24, 2009. The entirety of the above-mentioned patent application is hereby incorporated by reference herein and made a part of this specification.

BACKGROUND OF THE INVENTION

1. Field of the Invention

The present invention is related to a data processing method, and more particularly, to a data processing method for ensuring an exclusive right of a storage device, a data processing system and a storage device controller using the same.

2. Description of Related Art

Along with the development of the Universal Series Bus (USB) and the widespread of a flash memory, a flash drive that has a portable characteristic has become one of popular digital products. Because the volume of a floppy disk is smaller and data stored in an optical disc is not easy to be updated, the floppy disk and the optical disc have declined due to the appear of the flash drive.

Only if a computer system has a transmission interface complied with the flash drive, it will be very convenient to write data into the flash drive or read data from the flash drive, and data will be easy to be taken along. Thus, more and more users utilize flash drives to store various data, such that data can be processed in a private computer system or a public computer system.

However, a user may lose his flash drive unconsciously due to the smaller size of the flash drive. In particular, there is no any identification information in the flash drive. Therefore, even though someone picks up a lost flash drive, it is difficult to give the lost flash drive back to the owner. Moreover, many people may own flash drives which have the same forms due to the widespread of flash drives. Thus, it is more difficult to identify the owner of a flash drive. In this situation, important data stored in flash drives may be read by unallowable people due to misuse.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention is directed to a data processing method capable of preventing other people from falsifying disk label of a storage device and ensuring that private data stored in the storage device only be accessed by the owner of the storage device.

The present invention is directed to a data processing system capable of preventing other people from falsifying disk label of a storage device and ensuring that private data stored in the storage device only be accessed by the owner of the storage device.

The present invention is directed to a storage device controller capable of preventing other people from falsifying disk label of a storage device and ensuring that private data stored in the storage device only be accessed by the owner of the storage device.

According to an exemplary embodiment of the present invention, a data processing method is provided. The method includes providing a storage device and coupling the storage device to a host. The method also includes, when the host gives a write-in command and the write-in command includes a logical accessing address and a first data, determining whether the logical accessing address is one of logical accessing addresses of file system information of the storage device. When the logical accessing address is one of the logical accessing addresses of the file system information, the storage device writes a second data into the storage device at a predetermined time, wherein the second data is different from the first data.

According to an exemplary embodiment of the present invention, a data processing system having a host and a storage device coupled with each other is provided. The host gives a write-in command to the storage device, wherein the write-in command includes a logical accessing address and a first data. The storage device determines whether the logical accessing address is one of logical accessing addresses of file system information. When the logical accessing address is one of the logical accessing addresses of the file system information of the storage device, the storage device writes a second data into the storage device at a predetermined time, wherein the second data is different from the first data.

According to an exemplary embodiment of the present invention, a storage device controller configured in a storage device coupled to a host, wherein the storage device includes a storage medium. The storage device controller comprises a microprocessor unit, a storage medium interface unit, a host interface unit and a data processing unit. The storage medium interface unit is coupled to the microprocessor unit and configured to couple to the storage medium. The host interface unit is coupled to the microprocessor unit and configured to couple to a host. The data processing unit is coupled to the microprocessor unit. Herein when the host interface unit receives a write-in command given by the host and the write-in command includes a logical accessing address and a first data, the data processing unit determines whether the logical accessing address is one of logical accessing addresses of file system information. And, when the logical accessing address is one of the logical accessing addresses of the file system information, the data processing unit writes a second data into the storage medium at a predetermined time, wherein the second data is different from the first data.

As described above, the exemplary embodiment of the present invention can effectively prevent other people, besides the owner of the storage device, from falsifying the disk label of the storage device. And, when the storage device is coupled with a host, the detection for the host is performed. If the host is not the owner's host, personal information of the owner is displayed to ensure specific data stored in the storage device only be accessed by the owner of the storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
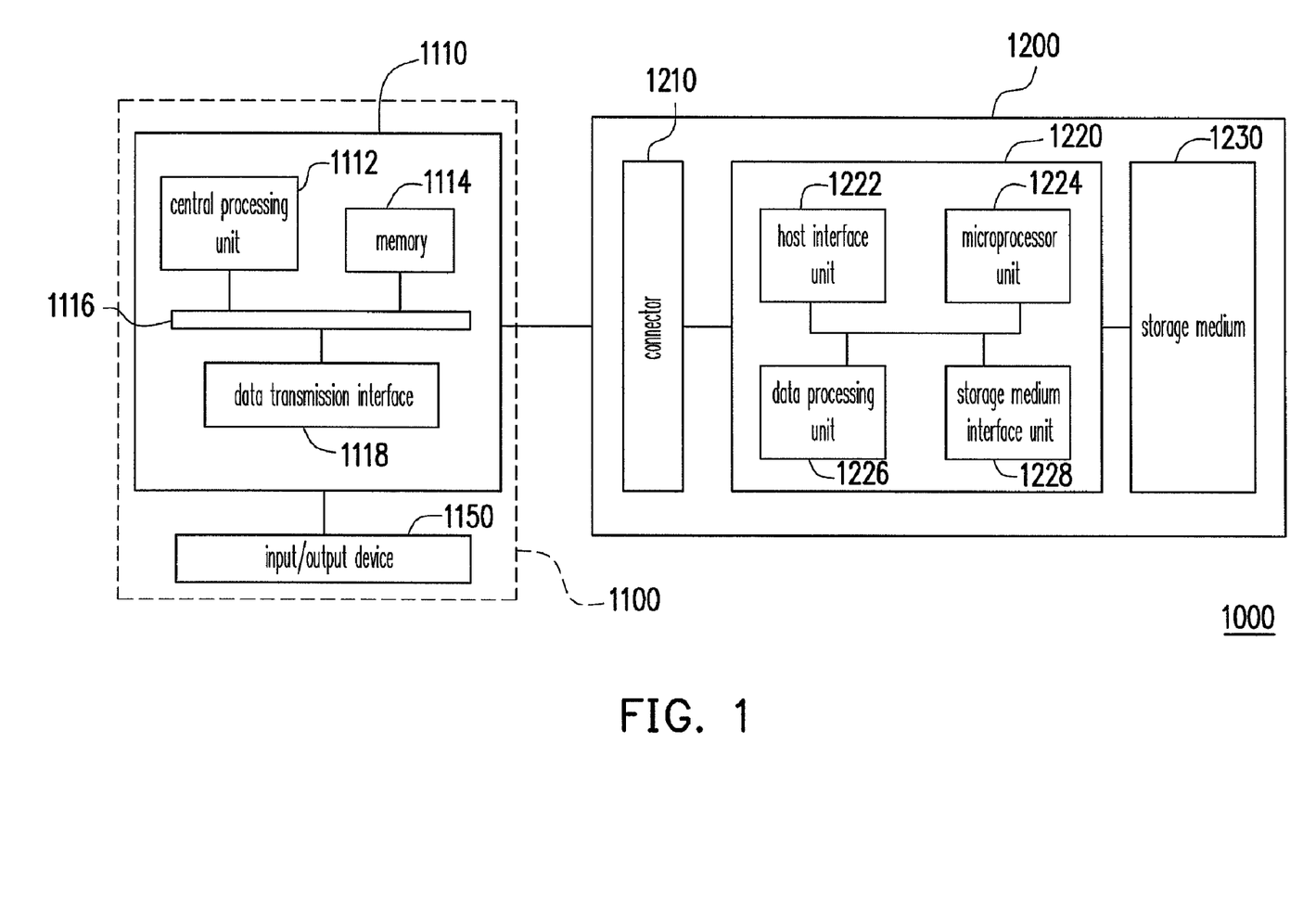
FIG. 1 is a schematic block diagram illustrating a data processing system according to an exemplary embodiment of the present invention.

FIG. 1 is a schematic block diagram illustrating a data processing system according to an exemplary embodiment of the present invention. As shown in FIG. 1, a data processing system 1000 comprises a host system 1100 and a storage device 1200. In the exemplary embodiment, the host system 1100 is a computer system, wherein the computer system comprises a computer host 1110 and an input/output (I/O) device 1150. However, in another exemplary embodiment, the host system 1100 may be a mobile device or a multimedia player.

Figure 2:
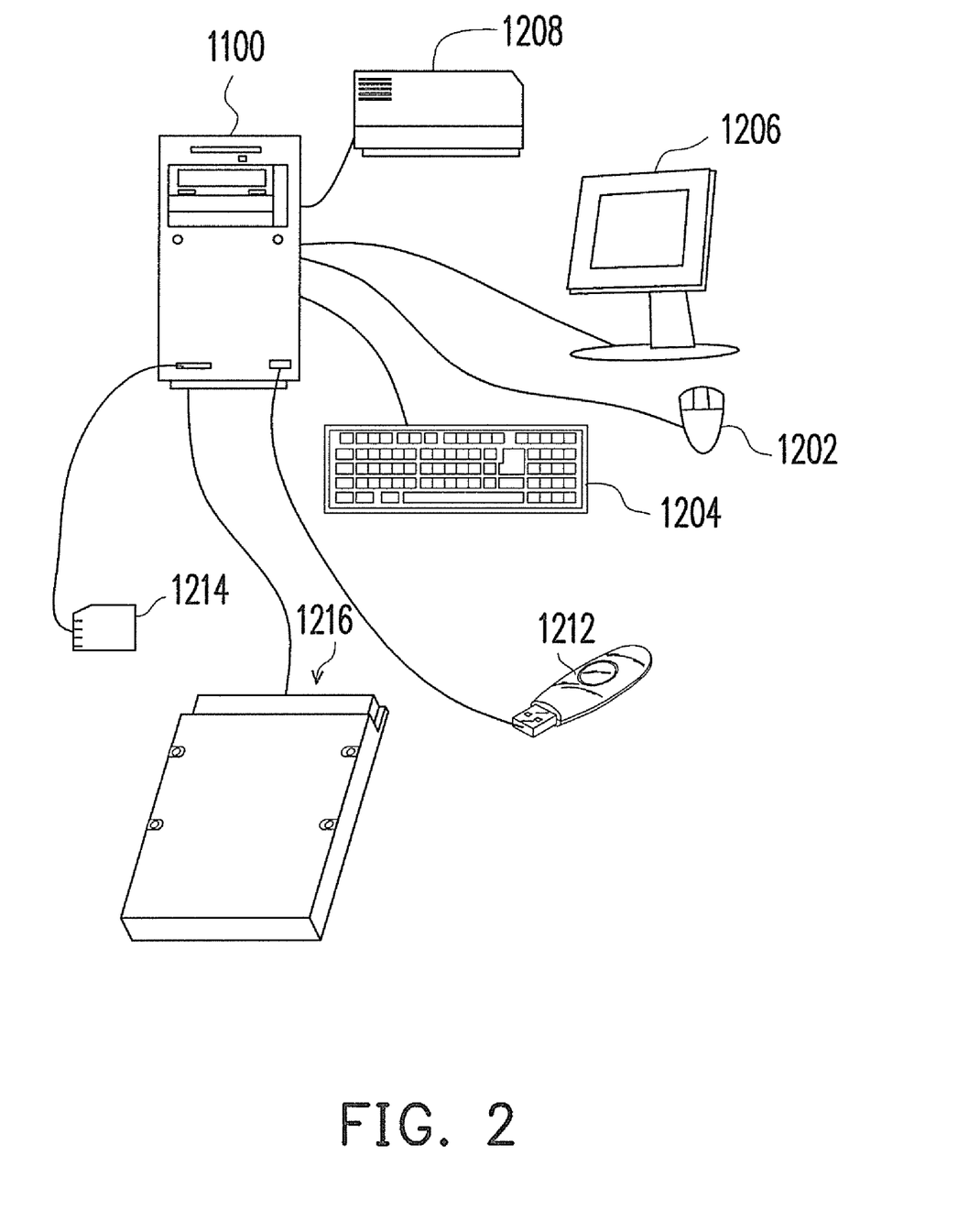
FIG. 2 is a diagram of a computer, an input/output (I/O) device, and a storage device according to an exemplary embodiment of the present invention.

In the exemplary embodiment, the computer host 1100 includes a central processing unit (CPU) 1112, a memory 1114, a system bus 1116, and a data transmission interface 1118. For example, the I/O device 1150 may be a mouse 1202, a keyboard 1204, a display 1206, and a printer 1208, as shown in FIG. 2, and the invention is not limited thereto.

The storage device 1200 comprises a connector 1210, a storage device controller 1220 and a storage medium 1230. For example, the storage device 1200 may be a flash drive 1212, a memory card 1214, or a solid state drive (SSD) 1216, as shown in FIG. 2.

The storage device 1200 may be coupled to the computer host 1110 through the data transmission interface 1118 and the connector 1210. Thus, the computer host 1110 may read data stored in the storage medium 1230 or write data into the storage medium 1230. In the present exemplary embodiment, a kind of transmission interface supported by the connector 1210 and the data transmission interface 1118 is a universal serial bus (USB) interface. However, the present invention is not limited thereto, and a kind of transmission interface supported by the connector 1210 and the data transmission interface 1118 may also be a serial advanced technology attachment (SATA) interface, a Parallel Advanced Technology Attachment (PATA) interface, an Institute of Electrical and Electronic Engineers (IEEE) 1394 interface, a peripheral component interconnect (PCI) express interface, a secure digital (SD) connector, a memory stick (MS) interface, a multi media card (MMC) interface, a compact flash (CF) interface, an integrated device electronics (IDE) interface, or other suitable interface.

For example, the storage medium 1230 is a NAND flash memory for storing file system information (e.g., a File Allocation Table) and storing general data (e.g., video files, text files).

The storage device controller 1220 is coupled to the connector 1210 and the storage medium 1230. In the exemplary embodiment, the storage device controller 1220 comprises a host interface unit 1222, a microprocessor unit 1224, a data processing unit 1226 and a storage medium interface unit 1228.

The storage device controller 1220 is coupled to the computer host 1110 through the host interface unit 1222 and the connector 1210 for receiving commands and data from the computer host 1110 and transmitting data to the computer host 1110. Herein the commands and data transmitted by the computer host 1110 are transmitted to the microprocessor unit 1224 through the host interface unit 1222.

In the exemplary embodiment, the host interface unit 1222 is a USB interface. However, in another exemplary embodiment, the host interface unit 1222 may be a SATA interface, a PATA interface, an IEEE 1394 interface, a PCI Express interface, a SD interface, an MS interface, an MMC interface, a CF interface, an IDE interface or other standard interface.

Additionally, the storage device controller 1220 is coupled to the storage medium 1230 through the storage medium interface unit 1228 for performing related operations to the storage medium 1230. In the exemplary embodiment, the storage medium interface unit 1228 is a flash memory interface unit.

As shown in FIG. 1, the host interface unit 1222, the data processing unit 1226 and the storage medium interface unit 1228 are coupled to the microprocessor unit 1224. The microprocessor unit 1224 is a main control unit of the storage device controller 1220 for cooperating with the host interface unit 1222, the data processing unit 1226 and the storage medium interface unit 1228 to perform various operations of the storage device 1200.

The data processing unit 1226 is configured for performing a data processing mechanism under a state that the storage device 1200 is coupled to the computer host 1110. Below, the operation of the data processing unit 1226 is described in detail with reference to accompanying drawings.

Figure 3:
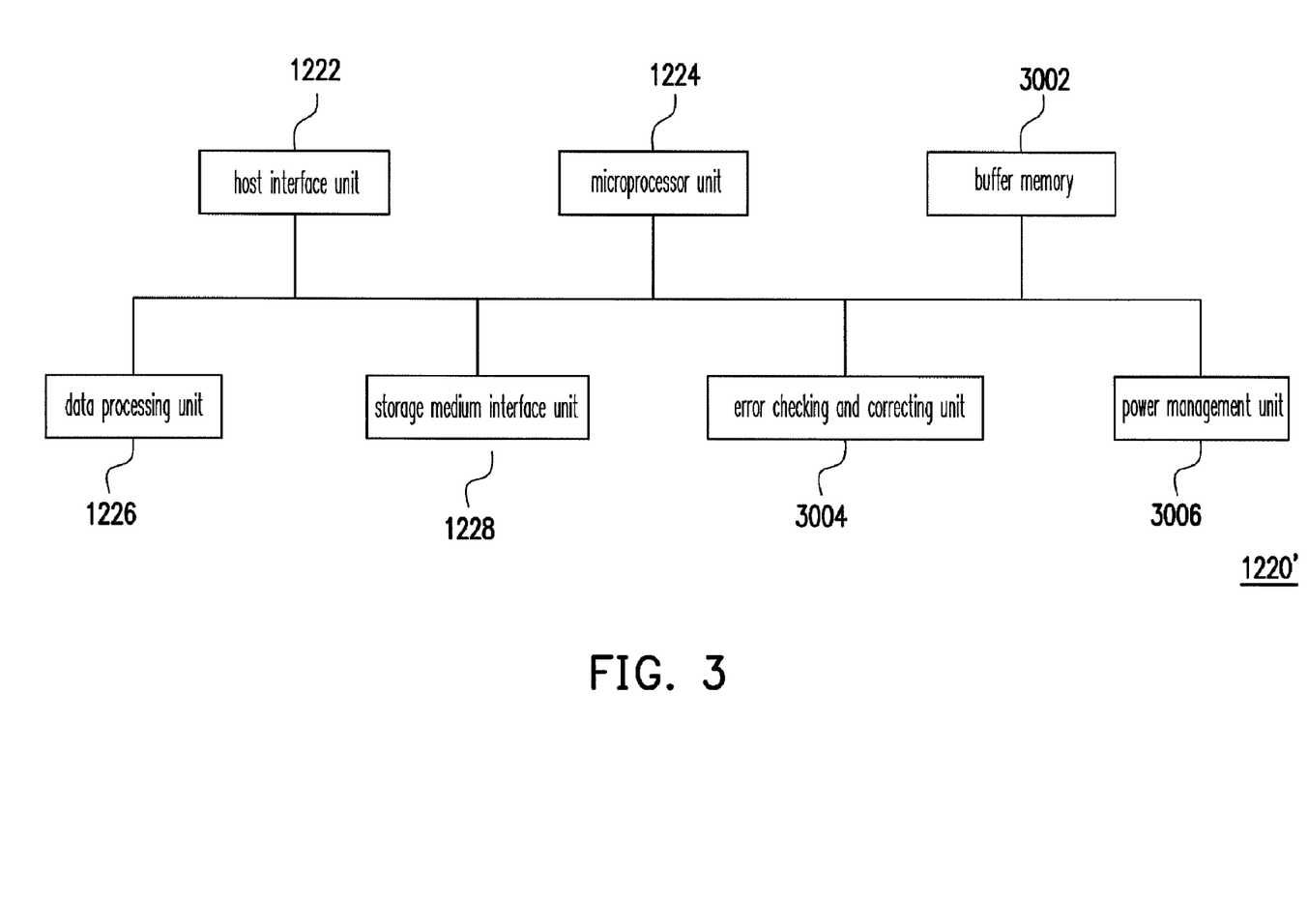
FIG. 3 is a schematic block diagram illustrating a storage device controller according to another exemplary embodiment of the present invention.

In another exemplary embodiment of the present invention, the storage device controller of the storage device further includes other functional modules. FIG. 3 is a schematic block diagram illustrating a storage device controller according to another exemplary embodiment of the present invention. Besides the host interface unit 1222, the microprocessor unit 1224, the data processing unit 1226 and the storage medium interface unit 1228, the storage device controller 1220' also comprises a buffer memory 3002, an error checking and correcting unit 3004 and a power management unit 3006.

In details, the buffer memory 3002 is coupled to the microprocessor unit 1224 for temporarily storing data from the computer host 1110 or data from the storage medium 1230.

The error checking and correcting unit 3004 is coupled to the microprocessor unit 1224, and configured for executing an error checking and correcting process to ensure data accuracy. Specifically, when the storage device controller 1220' receives a write-in command from the computer host 1110, the error checking and correcting unit 3004 generates an error checking and correcting code (ECC code) corresponding to the data to be written of the write-in command, and the data to be written and the corresponding ECC code are written into the storage medium 1230. And, when the storage device controller 1220' receives a read command from the computer host 1110, the storage device controller 1220' simultaneously reads data corresponding to the read command and the ECC code thereof from the storage medium 1230. At this time, the error checking and correcting unit 3004 performs the error checking and correcting process to the read data based on the ECC code corresponding to the read data.

The power management unit 3006 is coupled to the microprocessor unit 1222 and is used to control the power of the storage device 1200.

In the exemplary embodiment, when the storage device 1200 is coupled to the computer host 1110 and the computer host 1110 gives a write-in command including a logical accessing address and a first data to the storage device 1200, first, the data processing unit 1226 determines whether the logical accessing address of the write-in command is one of logical accessing addresses of file system information. During the above-mentioned determination, the data processing unit 1226 searches for a logical accessing address used for storing a disk label according to the file system information, and if the logical accessing address used for storing the disk label is found, the data processing unit 1226 records the logical accessing address used for storing the disk label as a mark address. Herein the file system information at least includes a file allocation table.

When the data processing unit 1226 determines the logical accessing address to be written by the computer host 1110 is not one of the logical accessing addresses of the file system information, the storage device controller 1220 writes the first data into the storage medium 1230 according to the logical accessing address of the write-in command.

However, when the data processing unit 1226 determines the logical accessing address to be written by the computer host 1110 is one of the logical accessing addresses of the file system information, it represents that an user operating the computer host 1110 is about to change the content of the disk label of the storage device 1200. In order to ensure that the disk label is not modified arbitrarily, the data processing unit 1226 writes a second data into the storage medium 1230 of the storage device 1200 at a predetermined time and responds a successful writing message to the computer host 1110. Herein the second data is data stored in the mark address and the second data is different from the first data. That is to say, in this status, the first data will be not written into the storage device 1200.

In the exemplary embodiment, for example, the data processing unit 1226 instantly writes the second data into the storage medium 1230 when the data processing unit 1226 determines that the logical accessing address to be written by the computer host 1110 is one of the logical accessing addresses of the file system information (i.e., on real time). However, in another exemplary embodiment, the data processing unit 1226 may write the second data into the storage medium 1230 after the storage device 1200 is coupled to the computer host 1110 again. Or, the data processing unit 1226 periodically writes the second data into the storage medium 1230 according to a regular time.

Figure 4:
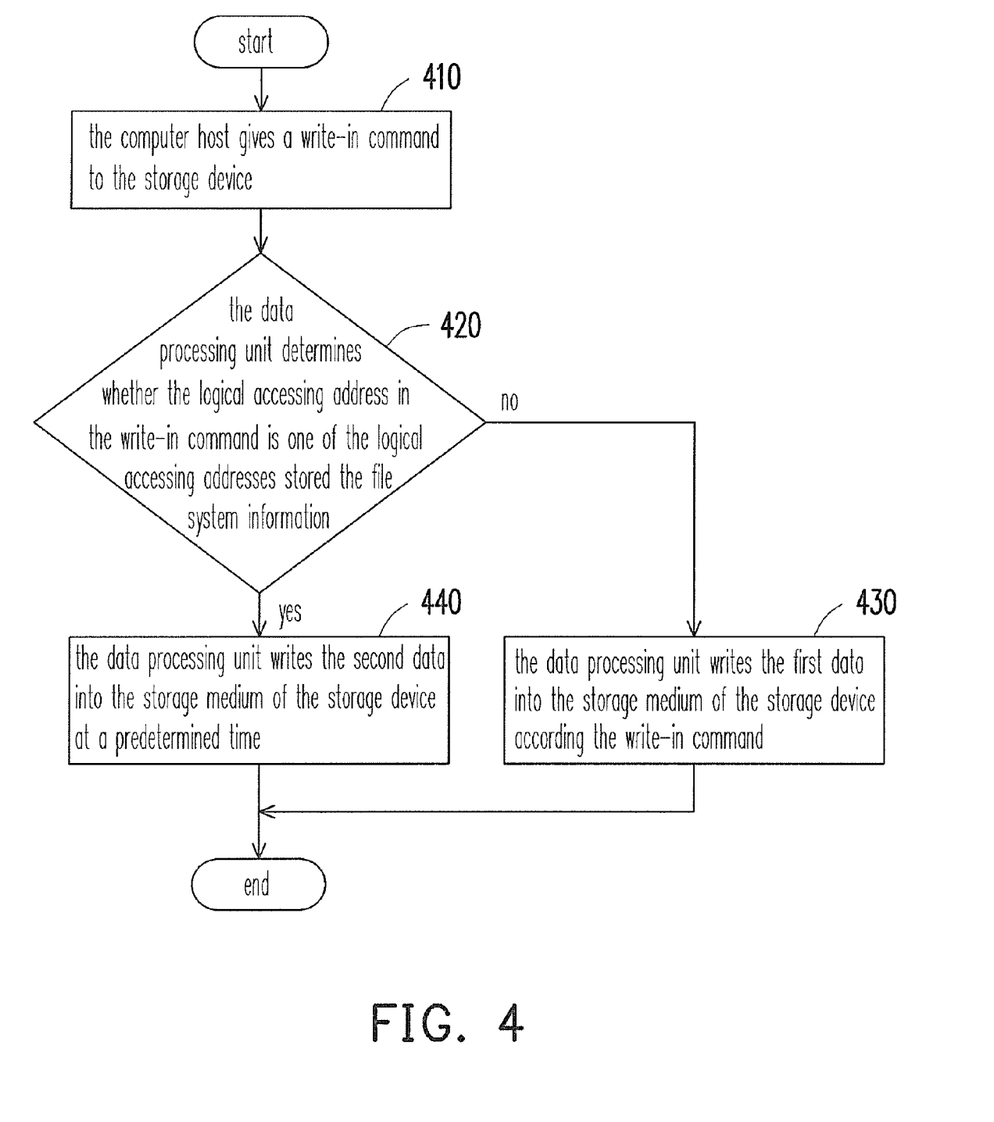
FIG. 4 is a flowchart illustrating a data processing method according to an exemplary embodiment of the present invention.

FIG. 4 is a flowchart illustrating a data processing method according to an exemplary embodiment of the present invention.

Referring to FIG. 4, in step 410, the computer host 1110 gives a write-in command to the storage device 1200. In step 420, the data processing unit 1226 of the storage device controller 1220 determines whether the logical accessing address of the write-in command is one of logical accessing addresses of file system information.

If the logical accessing address is not any one of the logical accessing addresses of the file system information, in step 430, the data processing unit 1226 writes the first data into the storage medium 1230 of the storage device 1200 according to the write-in command. If the logical accessing address is one of the logical accessing addresses of the file system information, in step 440, the data processing unit 1226 writes the second data which is different from the first data into the storage medium 1230 of the storage device 1200 at a predetermined time.

In the exemplary embodiment, after the storage device 1200 receives a write-in command from the computer host 1110, the storage device controller 1220 determines whether the computer host 1110 is about to change the content of the logical accessing addresses of the file system information. If the computer host 1110 is about to change the content of the logical accessing addresses of the file system information, another data will be written into the storage device 1200 without according to the write-in command. Accordingly, specific data (e.g., the disk label) in the file system information is avoided being changed arbitrarily. In particular, the computer host 1110 has received the successful writing message from the storage device controller 1220, and not tries to request other writing operation.

Figure 5:
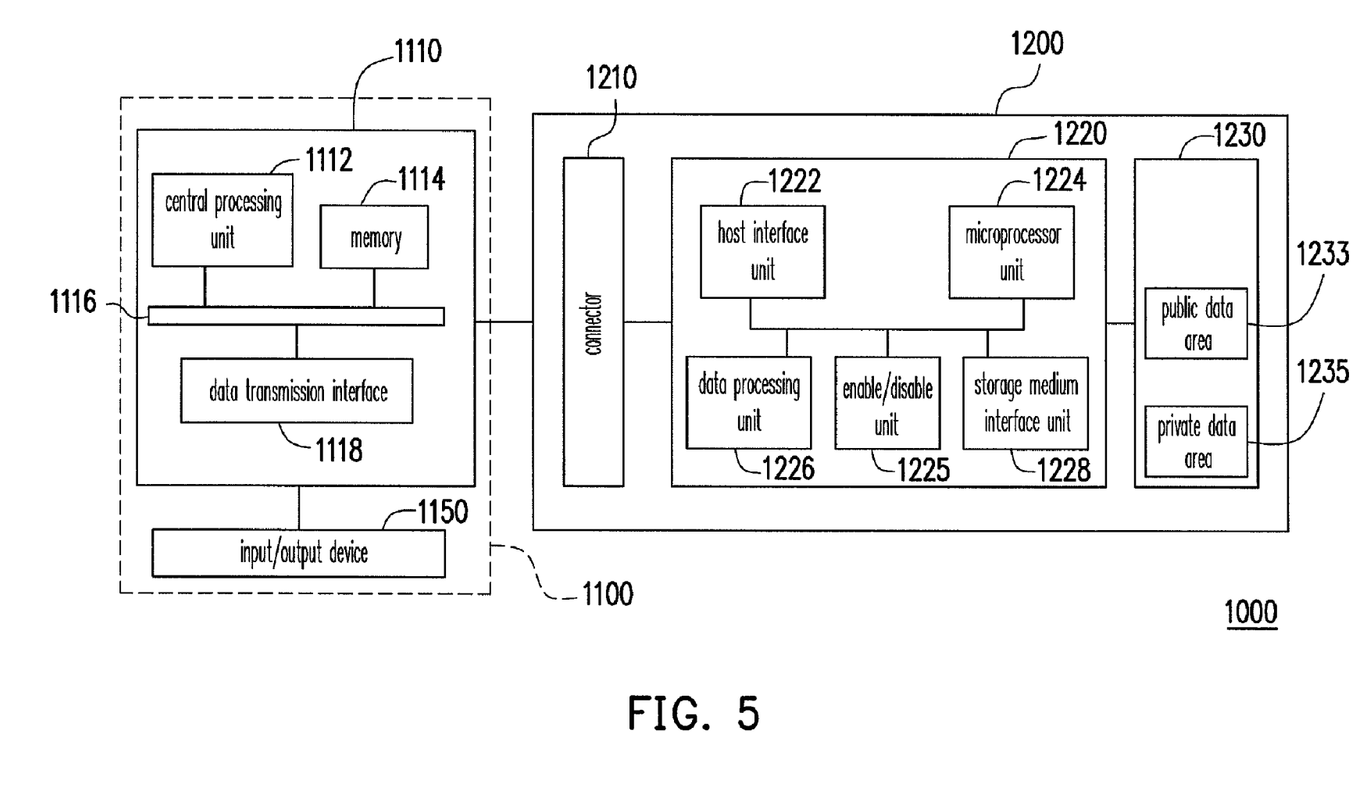
FIG. 5 is a schematic block diagram illustrating a data processing system according to another exemplary embodiment of the present invention.

FIG. 5 is a schematic block diagram illustrating a data processing system according to another exemplary embodiment of the present invention. A data processing system 1000 shown in FIG. 5 and that shown in FIG. 1 is similar. The difference between FIG. 5 and FIG. 1 is that the storage device controller 1200 shown in FIG. 5 further includes an enable/disable unit 1225, and the storage medium 1230 of the storage device 1200 includes a public data area 1233 and a private data area 1235. Only a specific computer host (e.g., the exclusive computer for the owner of the storage device 1200) may access the contents in the private data area 1235. And, any computer system may access the contents in the public data area 1233.

In the exemplary embodiment, the storage device 1200 includes a program (not shown) for changing the disk label of the storage device 1200. The program is stored in a write protected area, and thereby avoided being deleted or changed by users. For example, the write protected area is an area which is set with a password for protecting in the storage medium 1230, or is a system area that users can not access data thereon in the storage medium 1230. The program is set with a password set by the owner of the storage device 1200, and only when a right password is inputted, the function of changing the disk label in the program is enabled. To be specific, after the program is run, the program may control the enable/disable unit 1225 to turn on or turn off according to operations of the owner, thereby allowing or not allowing the change of the disk label. For example, when the enable/disable unit 1225 is turned off, the change of the disk label is not allowed. On the other hand, when the enable/disable unit 1225 is turned on by the program, users are allowed to change the disk label of the storage device 1200. Because the password for the program is set by the owner of the storage device 1200, falsifying the disk label of the storage device by other people is prevented.

Besides, the owner may record default host identification information and the owner's personal information in the storage medium 1230 of the storage device 1200. Herein, for example, the default host identification information is serial number information of a central processing unit or serial number information of a display card of the exclusive computer for the owner of the storage device 1200. And, for example, the owner's personal information includes a name, an e-mail address, a telephone number or an address. It should be mentioned that the default host identification information and the owner's personal information must be modified through the program.

In the exemplary embodiment, after the storage device 1200 is coupled to the computer host 1110, the program automatically performs a determination for determining whether third data stored in the storage medium 1230 (e.g., the default host identification information) is the same as fourth data of the computer host 1110 (e.g., identification information of the computer host 1110). When the program determines that the third data is different from the fourth data, it represents that the computer host 1110 is not the exclusive computer for the owner of the storage device 1200. Therefore, the program transmits fifth data (e.g., the owner's personal information) to the computer host 1110 and the computer host 1110 displays the owner's personal information.

Accordingly, when the owner lost the storage device 1200, a people who picks up the storage device 1200 may couple the storage device 1200 to a computer host, and contact the owner according to the owner's personal information displayed through the computer host and give the storage device 1200 back to the owner. Thus, probability that the storage device 1200 is given back to the owner will be increased greatly.

Additionally, after the storage device 1200 is coupled to the computer host 1110, if the program determines the third data stored in the storage medium 1230 (e.g., the default host identification information) is the same as the fourth data of the computer host 1110 (e.g., identification information of the computer host 1110), it represents that the computer host 1110 is the exclusive computer for the owner of the storage device 1200, and thus the program makes the public data area 1233 and the private data area 1235 open to access. That is, at this status, the computer host 1110 may read data stored in the public data area 1233 or the private data area 1235, and write data into the public data area 1233 or the private data area 1235.

On the other hand, if the third data stored in the storage medium 1230 is different from the fourth data of the computer host 1110, the program only make the public data area 1233 open to access. And, data stored in the private data area 1235 is protected without be accessed arbitrarily.

As described above, the data processing method and system and the storage device controller according to the exemplary embodiment of the present invention are capable of preventing that the disk label of the storage device is falsified by other people. And, when the storage device is coupled with a non-default host, the owner's personal information is displayed and the accesses of a portion of files or areas is prohibited, and thus the exclusive right of the storage device is built and probability that the storage device is given back to the owner will be increased when the storage device is lost. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data processing method, comprising:
   receiving a write-in command from a host coupled to a storage device, wherein the write-in command includes a logical accessing address and a first data;
   determining whether the logical accessing address is one of logical accessing addresses of a disk label of the storage device; and
   writing second data stored in the storage device before receiving the first data into the storage device to replace the first data at a predetermined time by the storage device when the logical accessing address is one of the logical accessing addresses of the disk label, wherein the second data is different from the first data.

2. The data processing method according to claim 1, wherein the predetermined time is a real time, a time that the storage device is coupled to the host again or a regular time.

3. The data processing method according to claim 1, further comprising:
   responding a successful writing message to the host.

4. The data processing method according to claim 1, wherein the step of determining whether the logical accessing address is one of the logical accessing addresses of the disk label comprises:
   searching for a logical accessing address stored the disk label in the storage device according to a file system; and
   recording the logical accessing address stored the disk label as a mark address when the logical accessing address stored the disk label is found.

5. The data processing method according to claim 4, wherein the second data is data stored in the mark address.

6. The data processing method according to claim 4, wherein the storage device includes a program and the program is configured to change the disk label and the program is set with a password.

7. The data processing method according to claim 6 further comprises:
   determining whether third data stored in the storage device is the same as fourth data of the host by the program; and
   transmitting fifth data stored in the storage device to the host by the program and displaying the fifth data by the host when the third data stored in the storage device is different from the fourth data of the host.

8. The data processing method according to claim 7, further comprises:
   configuring a public data area and a private data area in the storage device;
   making the public data area and the private data area open to access when the third data stored in the storage device is the same as the fourth data of the host; and
   only making the public data area open to access when the third data stored in the storage device is different from the fourth data of the host.

9. The data processing method according to claim 7, wherein the third data is a default host identification information, the fourth data is an identification information of the host, and the fifth data is an owner personal information.

10. A data processing system, comprising:
a host; and
a storage device, coupled to the host,
wherein the host gives a write-in command, the write-in command includes a logical accessing address and a first data,
the storage device determinates whether the logical accessing address is one of logical accessing addresses of a disk label of the storage device, and the storage device writes second data stored in the storage device before receiving the first data into the storage device to replace the first data at a predetermined time when the logical accessing address is one of the logical accessing addresses of the disk label, wherein the second data is different from the first data.

11. The data processing system according to claim 10, wherein the predetermined time is a real time, a time that the storage device is coupled to the host again or a regular time.

12. The data processing system according to claim 10, the storage device searches for a logical accessing address stored the disk label according to a file system, and records the logical accessing address stored the disk label as a mark address when the logical accessing address stored the disk label is found.

13. The data processing system according to claim 12, wherein the second data is data stored in the mark address.

14. A storage device controller, configured in a storage device coupled to a host and the storage device includes a storage medium, the storage device controller comprises:
a microprocessor unit;
a storage medium interface unit, coupled to the microprocessor unit and configured to couple to the storage medium;
a host interface unit, coupled to the microprocessor unit, and configured to couple to the host; and
a data processing unit, coupled to the microprocessor unit,
wherein when the host interface unit receives a write-in command from the host and the write-in command includes a logical accessing address and a first data, the data processing unit determines whether the logical accessing address is one of logical accessing addresses of a disk label of the storage device,
the data processing unit writes second data stored in the storage device before receiving the first data into the storage medium to replace the first data at a predetermined time when the logical accessing address is one of the logical accessing addresses of the disk label, wherein the second data is different from the first data.

15. The storage device controller according to claim 14, wherein the predetermined time is a real time, a time that the storage device is coupled to the host again or a regular time.

16. The storage device controller according to claim 14, wherein the data processing unit responds a successful writing message to the host after the second data is written into the storage medium.

17. The storage device controller according to claim 14, the data processing unit searches for a logical accessing address stored the disk label according to a file system, and records the logical accessing address stored the disk label as a mark address when the logical accessing address stored the disk label is found.

18. The storage device controller according to claim 17, wherein the second data is data stored in the mark address.

19. The storage device controller according to claim 17, wherein the storage device further includes a program and the program is configured to change the disk label and the program is set with a password.

20. The storage device controller according to claim 16, wherein the storage device further includes an enable/disable unit, the program controls the enable/disable unit to turn on or turn off to allow or not allow for changing the disk label.

21. The storage device controller according to claim 16, wherein the program determines whether third data stored in the storage medium is the same as fourth data of the host, and the program transmits fifth data stored in the storage device to the host and the host displays the fifth data when the third data stored in the storage medium is different from the fourth data of the host.

22. The storage device controller according to claim 21, wherein the storage medium includes a public data area and a private data area, the program makes the public data area and the private data area open to access when the third data stored in the storage medium is the same as the fourth data of the host, and the program only makes the public data area open to access when the third data stored in the storage medium is different from the fourth data of the host.

23. The storage device controller according to claim 21, wherein the third data is a default host identification information, the fourth data is an identification information of the host, and the fifth data is an owner personal information.

* * * * *